United States Patent [19]

Mawatari et al.

[11] Patent Number: 5,231,476
[45] Date of Patent: Jul. 27, 1993

[54] LUMINANCE/CHROMINANCE SEPARATING APPARATUS

[75] Inventors: Masahiko Mawatari; Takashi Koga; Seiichi Tanaka; Naoki Matsuda; Masatoshi Sumiyoshi, all of Tokyo, Japan

[73] Assignee: Kabushiki Kaisha Toshiba, Kanagawa, Japan

[21] Appl. No.: 786,129

[22] Filed: Nov. 4, 1991

[30] Foreign Application Priority Data

Nov. 5, 1990 [JP] Japan .................................. 2-299550

[51] Int. Cl.$^5$ .......................... H04N 9/64; H04N 9/78
[52] U.S. Cl. .................................................... 358/31
[58] Field of Search ...................... 358/31, 105, 36, 37, 358/22, 23, 30

[56] References Cited

U.S. PATENT DOCUMENTS

| | | | |
|---|---|---|---|
| 4,870,482 | 9/1989 | Yasuki et al. | 358/31 |
| 4,930,012 | 5/1990 | Fujita | 358/31 |
| 4,982,271 | 1/1991 | Sugiyama et al. | 358/31 |
| 4,994,900 | 2/1991 | Ebara et al. | 358/31 |

OTHER PUBLICATIONS

"Motion Adaptive Processing for Improved Television Receiver", ITEJ Technical Report, vol. 12, No. 51, pp. 1-6, K. Sokawa, et al. Nov. 1988.
"Motion Adaptive 3 Dimensional Y/C Separation Processing", ITEJ Technical Report, vol. 12, No. 51, pp. 7-12, M. Ebara, et al. Nov. 1988.
"Development of Double Resolution Non-Interlace Digital TV", ITEJ Technical Report vol. 12, No. 51, pp. 19-24, Nov. 1988.

Primary Examiner—James J. Groody
Assistant Examiner—Michael H. Lee
Attorney, Agent, or Firm—Finnegan, Henderson, Farabow, Garrett & Dunner

[57] ABSTRACT

A Y/C separating apparatus includes a first separator for separating a stationary C component which has a demodulator for demodulating a color difference signal from the composite video signal with a color subcarrier signal, a detector for detecting a frame difference signal between two adjacent frames of the color difference signal and a modulator for modulating the frame difference signal with the color subcarrier signal so as to reproduce the stationary C component. Also included is a second separator for separating a moving C component by detecting a line difference signal between adjacent lines of the composite video signal, a motion detector for detecting a motion signal as a frame change between adjacent frames of the composite video signal, a first subtractor for subtracting the stationary C signal from the composite video signal so as to separate a stationary Y component, a second subtractor for subtracting the moving C component from the composite video signal so as to separate a moving Y component, a first mixer responsive to the motion signal for mixing the stationary C component and the moving C component with each other so as to output the C component and a second mixer responsive to the motion signal for mixing the stationary Y component and the moving Y component with each other to output the Y component.

12 Claims, 7 Drawing Sheets

FIG. 3A  C COMPONENT FROM LINE MEMORY 4 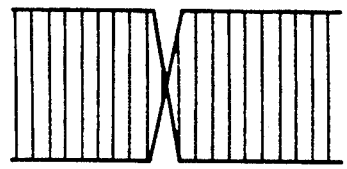
FIG. 3B  OUTPUT FROM BPF 31 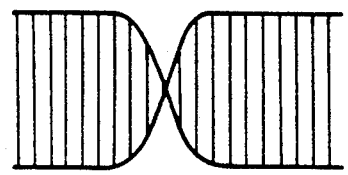
FIG. 3C  INPUT TO NON-LINEAR ENHANCER 41 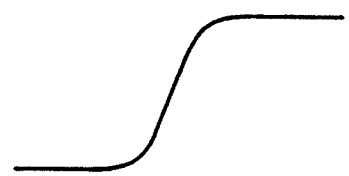
FIG. 3D  INPUT TO NON-LINEAR ENHANCER 42 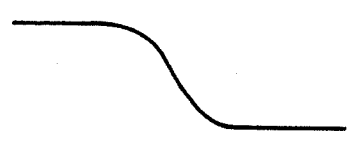
FIG. 3E  OUTPUT FROM NON-LINEAR ENHANCER 41 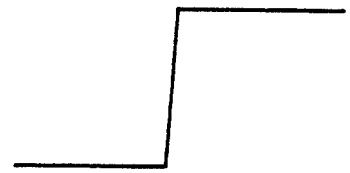
FIG. 3F  OUTPUT FROM NON-LINEAR ENHANCER 42 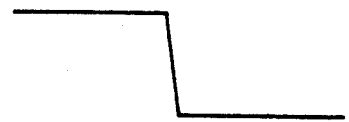
FIG. 3G  CARRIER CHROMINANCE COMPONENT FROM MODULATOR 43 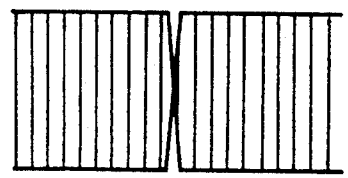
FIG. 3H  OUTPUT FROM BPF 44 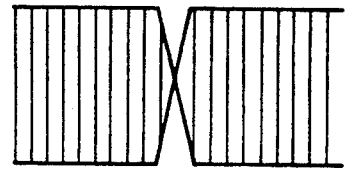

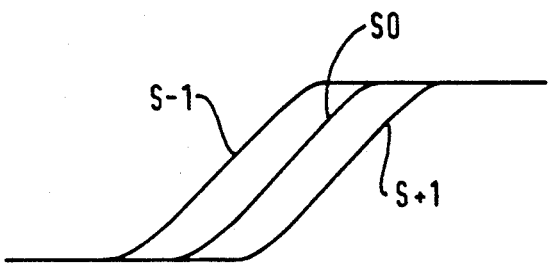
FIG. 7A
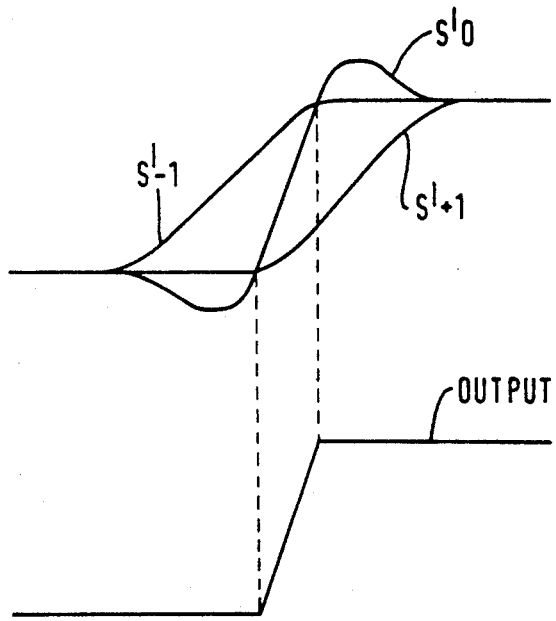
FIG. 7B
FIG. 7C

LUMINANCE/CHROMINANCE SEPARATING APPARATUS

FIELD OF THE INVENTION

The present invention relates generally to a luminance/chrominance separating apparatus, i.e., an apparatus for separating luminance and chrominance components in a composite video signal, which is suited to be used in television sets, video tape recorders and the like.

BACKGROUND OF THE INVENTION

FIG. 1 shows a prior art luminance/chrominance separating apparatus (hereinafter referred to as "Y/C" separator) which is conventionally used in a video signal processing circuit of such television receivers. The Y/C separator is implemented by a well-known three-dimensional Y/C separation technique using components of the video signal in the horizontal axis, the vertical axis and the time axis.

In FIG. 1, a composite video signal is input to an input terminal 800 and then supplied to a luminance component separator (hereinafter referred to as Y processing unit) 801 and a chrominance component separator (hereinafter referred to as C processing unit) 802.

The Y processing unit 801 includes a stationary Y processor 811 and a moving Y processor 812, which are disclosed in the "ITEJ Technical Report", Vol. 12, No. 51, pp. 106 (Nov., 1988). These processors 811 and 812 are suited for separating the Y component in stationary pictures and moving pictures, respectively. The stationary and moving Y components are selectively applied to a subtractor 814 through a switching unit 813.

The moving Y processor 812 comprises a line memory 821, a line memory 822, a correlation checking unit 823 and a band pass filter (band pass filter is hereinafter referred to as BPF) 824. The composite video signal on the input terminal 800 is applied to the line memory 821 wherein the composite video signal is delayed by one horizontal scanning period (hereinafter referred to as "1H" period). An output from the line memory 821 is supplied to the line memory 822 wherein the composite video signal is further delayed by the 1H period. The composite signals from the input terminal 800, the line memory 821 and the line memory 822 are applied to the correlation checking unit 823. The correlation checking unit 823 checks correlations among the three composite video signals so that an output therefrom represents uncorrelated signal components among the three composite video signals.

The uncorrelated signal components are applied to the BPF 824. The BPF 824 has a characteristic for passing a color subcarrier signal. Thus the uncorrelated signal components output from the BPF 824 are mainly chrominance components (hereinafter referred to as C components). The C components are applied to the switching unit 813.

The stationary Y processor 811 comprises a frame memory 825, a subtractor 826 and a BPF 826. The composite video signal from the line memory 821 of the moving Y processor 812 is also applied to the frame memory 825 and the subtractor 826. In the frame memory 825, the composite video signal is delayed by one frame period. In the subtractor 826, the composite video signals from the line memory 821 and the frame memory 825 are subtracted from each other. Thus an output from the subtractor 826 also represents uncorrelated components between the two composite video signals.

The uncorrelated signal components from the subtractor 826 are applied to the BPF 827. The BPF 827 has also such a characteristic for passing a color subcarrier signal. The signal extracted by the BPF 827 is applied to the switching unit 813.

The switching unit 813 selectively outputs either the signal from the stationary Y processor 811 or the signal from the moving Y processor 812 under the control of a motion detector 805. The motion detector 805 outputs a signal representing a motion of a picture in the composite video signal, as disclosed in the U.S. Pat. No. 4,626,891. When there occurs a motion in the picture, a signal, e.g., a logic level of "1" representing the motion causes the switching unit 813 to output the signal from the stationary Y processor 811. When there occurs non-motion in the picture, another signal, e.g., a logic level of "0" representing the non-motion causes the switching unit 813 to output the signal from the moving Y processor 812.

The selected signal from the switching unit 813 is applied to the subtractor 814 wherein it is subtracted from the composite video signal from the line memory 821. The signal from the switching unit 813 represents the C component, as described above. Thus, a luminance component (hereinafter referred to as Y component) is obtained.

The C processor 802 includes a color demodulator 831, a time-division multiplexer 832, a stationery C processor 838, a moving C processor 833 and a switching unit 837, as also disclosed in the above-mentioned "ITEJ Technical Report". These processors 838 and 833 are suited for separating the C component in stationary pictures and moving pictures, respectively. The stationary and moving Y components are selectively output through the switching unit 837.

The composite video signal on the input terminal 800 is also applied to the color demodulator 831 which demodulates I and Q signals as baseband signals of the chrominance components from the composite video signal. However, the outputs of the color demodulator 831 contain high frequency components of the Y components. The I and Q signals are multiplexed in a time-sequential form by the time division multiplex circuit 832 and then applied to the moving C processor 833.

The moving C processor 833 comprises a line memory 834, a line memory 835 and a correlation checking unit 836. The multiplexed signal output from the time division multiplex circuit 832 is applied to the line memory 834 wherein the multiplexed signal is delayed by 1H period. An output from the line memory 834 is supplied to the line memory 835 wherein the multiplexed signal is further delayed by the 1H period. The multiplexed signals from the time division multiplex circuit 832, the line memory 834 and the line memory 835 are applied to the correlation checking unit 836.

The correlation checking unit 836 checks correlations among the three multiplexed signals so that an output therefrom represents uncorrelated signal components among the three multiplexed signals. The uncorrelated signal components include mainly the I and Q components. The I and Q components are applied to the switching unit 837.

The stationary C processor 838 comprises a frame memory 839 and an adder 840. The multiplexed signal from the line memory 834 of the moving C processor 833 is also applied to the frame memory 839 and the adder 840. In the frame memory 839, the multiplexed signal is delayed by one frame period. In the adder 840, the multiplexed signals from the line memory 834 and the frame memory 839 are subtracted from each other. Thus an output from the adder 840 also represents uncorrelated components between the two multiplexed signals. The uncorrelated signal components from the adder 840 are applied to the switching unit 837.

The switching unit 837 selectively outputs either the signal from the stationary C processor 838 or the signal from the moving C processor 833 under a control of the motion detector 805. When there occurs a motion in the picture, the signal representing the motion causes the switching unit 837 to output the signal from the stationary C processor 838. When there occurs no motion in the picture, the signal representing the no motion causes the switching unit 837 to output the signal from the moving C processor 833. The selected signal from the switching unit 813 represents the I and Q components, as described above.

In the prior art Y/C separator, the Y component and the C component are separated by both the Y processor 801 and the C processor 802. Each of the processors 811 and 812 uses a frame memory which needs a huge memory capacity and thus is very expensive. Furthermore, the I and Q components obtained by the prior art Y/C separator are not able to directly couple to home VTRs such as VHS type VTRs, 8-mm type VTRs, etc.

SUMMARY OF THE INVENTION

It is, therefore, an object of the present invention to provide a luminance/chrominance separating apparatus which is able to separate a luminance component and a chrominance component by using a relatively simple circuit.

Another object of the present invention is to provide a luminance/chrominance separating apparatus which is able to separate a luminance component and a chrominance component without using a plurality of frame memories.

Still another object of the present invention is to provide a luminance/chrominance separating apparatus which is able to produce luminance and chrominance components which are able to directly couple to home VTRs.

In order to achieve the above objects, a Y/C separator according to one aspect of the present invention includes a first separator for separating a stationary chrominance component which has a demodulator for demodulating a color difference signal from the composite video signal with a color subcarrier signal, a detector for detecting a frame difference signal between two adjacent frames of the color difference signal and a modulator for modulating the frame difference signal with the color subcarrier signal so as to reproduce the stationary chrominance component, a second separator for separating a moving chrominance component by detecting a line difference signal between adjacent lines of the composite video signal, a motion detector for detecting a motion signal as a frame change between adjacent frames of the composite video signal, a first subtractor for subtracting the stationary chrominance component from the composite video signal so as to separate a stationary luminance component, a second subtractor for subtracting the moving chrominance component from the composite video signal so as to separate a moving luminance component, a first mixer responsive to the motion signal for mixing the stationary chrominance component and the moving chrominance component with each other so as to output the chrominance component and a second mixer responsive to the motion signal for moving the stationary luminance component and the moving luminance component with each other to output the luminance component.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 3A to 3H are waveform diagrams of signals at various sections in the luminance/chrominance separating apparatus of FIG. 2;

FIGS. 7A, 7B and 7C are timing charts for explaining the operation of the non-linear enhancer of FIG. 4.

DESCRIPTION OF THE PREFERRED EMBODIMENTS

The present invention will be described in detail with reference to the FIGS. 2 through 8.

Figure 1:
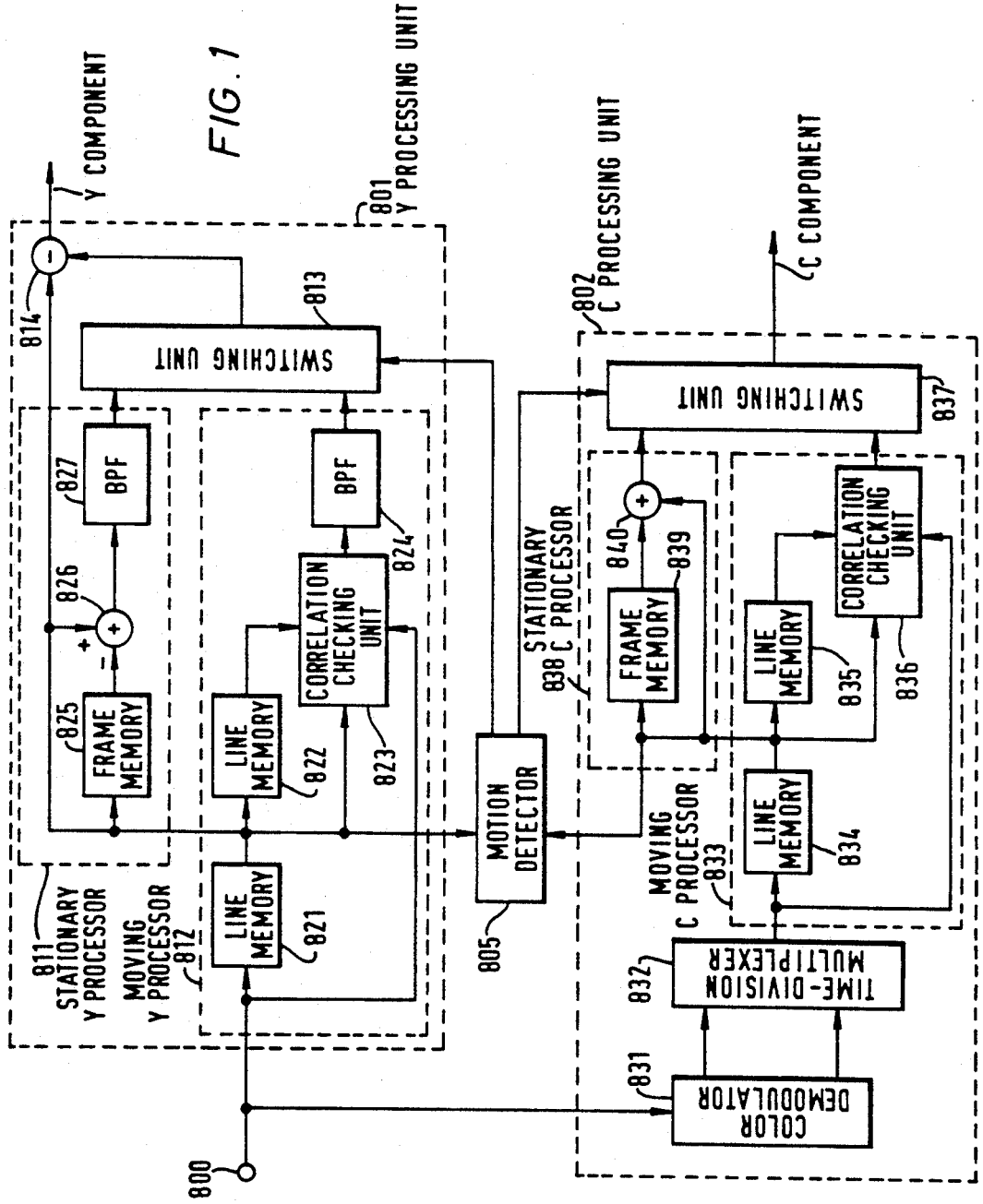
FIG. 1 is a block diagram showing a prior art luminance/chrominance separating apparatus.
Figure 2:
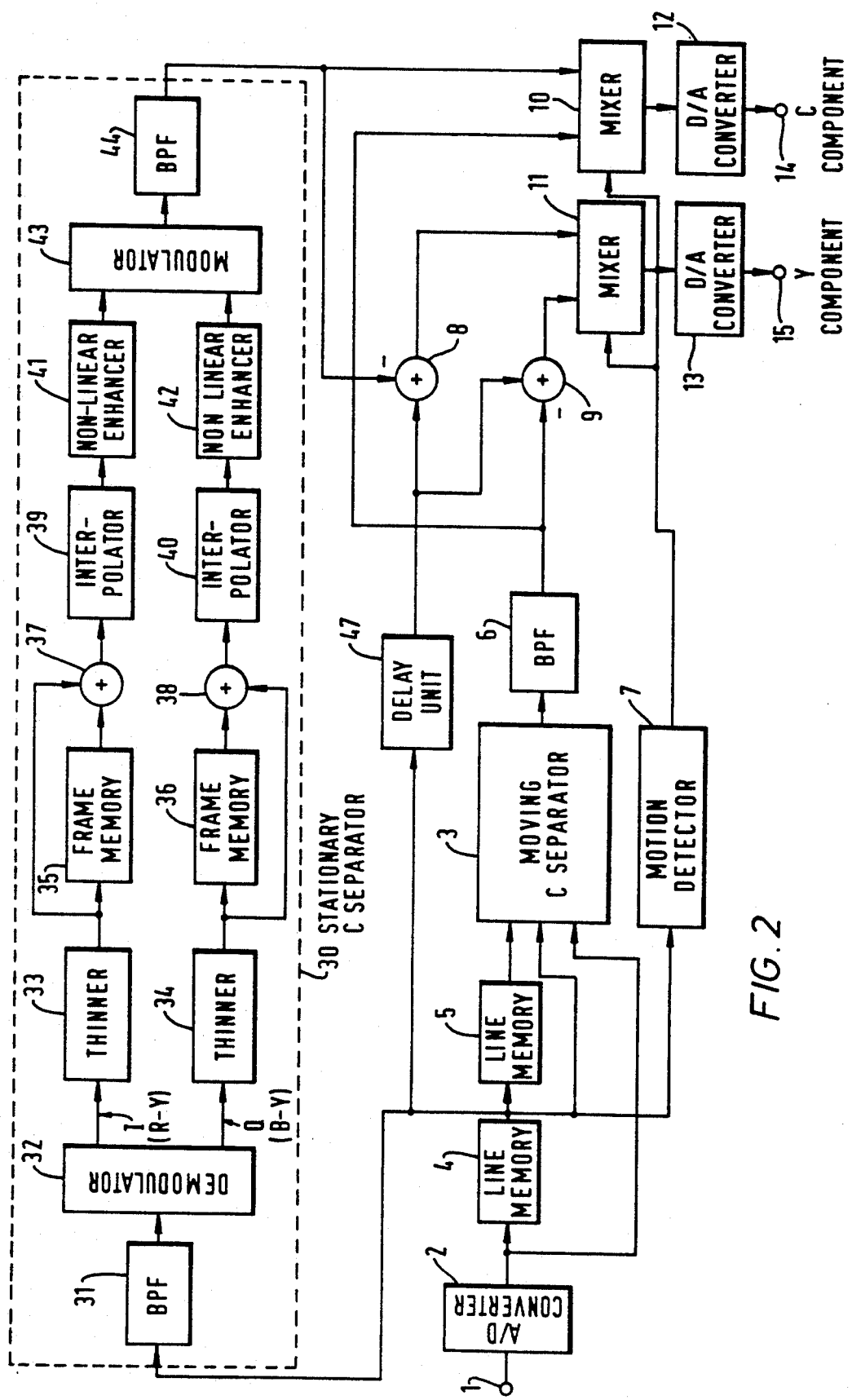
FIG. 2 is a block diagram showing an embodiment of the luminance/chrominance separating apparatus according to the present invention.

Referring now to FIG. 2, an embodiment of the luminance/chrominance separating apparatus (hereinafter also referred to as "Y/C" separator) according to the present invention will be described in detail.

FIG. 2 shows the embodiment of the Y/C separator. A composite video signal is input to an input terminal 1 and then applied to an analog/digital converter (hereinafter referred to as "A/D" converter) 2. The A/D converter 2 converts the composite video signal from an analog form to a digital form. The digital composite video signal is applied to a moving C separator 3 and a line memory 4 which delays signals by 1H period. The output signal from the line memory 4 is applied to the moving C separator 3, a line memory 5 and a motion detector 7. The output signal from the line memory 4 is further applied to subtractors 8 and 9 through a delay unit 47 for matching the timings of input signals to the subtractors 8 and 9. The output signal from the line memory 5 is applied to the moving C separator 3.

The moving C separator 3 extracts vertical high frequency band components by operating three lines in using the vertical correlation of the three lines. The vertical high frequency band components are applied to a BPF 6. The BPF 6 passes a color subcarrier band signal component. This color subcarrier band signal is the chrominance component at the time of the moving picture (here, this signal is called the moving C component). This moving C component is applied to the subtractor 9 and a mixer 10. The subtractor 9 carries out a subtraction between the moving C component and the output signal from the line memory 4. Thus a Y component is output from the subtractor 9. This Y component will be referred to as the moving Y component hereinafter. The moving Y component is applied to a mixer 11.

The output signal from the line memory 4 is applied to a stationary C separator 30. In the stationary C separator 30, the signal is applied to a BPF 31. The BPF 31 extracts the color subcarrier band signal component. The color subcarrier band signal is applied to a demodulator 32. The demodulator 32 demodulates I and Q components as baseband signals of the chrominance components from the color subcarrier band signal by carrier signals which are synchronized with the color subcarrier signal with orthogonally related axes, i.e., I and Q axes. The I and Q axes have phases of 123° and 33°, respectively, when a burst signal has the phase of −180°. The I and Q components may contain high frequency band components of the Y component. The I and Q components are applied to thinners 33 and 34, respectively.

Here, the digital composite video signal before demodulation has been sampled at a sampling rate of 4.Fsc clock (wherein Fsc is the color subcarrier frequency), but such higher sampling rate of 4.Fsc is not necessary after the demodulation. The is because the I and Q components have been originally normalized in the bands by 1.5 MHz and 0.5 MHz, respectively, and thus information will not be lost even when they are thinned in the thinners 33 and 34. The thinning rates will be, for instance, about Fsc for the I component and Fsc/3 for the Q component. Further, the demodulations of the I and Q components may be replaced with demodulations of color difference signals "R-Y" and "B-Y" or any two orthogonally related signals synchronized with the color subcarrier frequency. Here the thinners 33 and 34 can be constituted by digital LPFs with cut-off frequencies of 1.5 MHz and 0.5 MHz, respectively.

The output from the thinner 33 is applied to a frame memory 35 and an adder 37. Also the output from the thinner 34 is applied to a frame memory 36 and an adder 38. The adder 37 adds the outputs from the frame memory 35 and the output from the thinner 33. Thus an inter-frame correlation signal of the I components between two adjacent frames is output from the adder 37. Further, an inter-frame correlation signal of the Q components between two adjacent frames is output from the adder 38. These inter-frame correlation signals are applied to interpolators 39 and 40, respectively.

The interpolators 39 and 40 interpolate the inter-frame correlation signals which have been thinned out in the thinners 33 and 34. Thus, outputs of the interpolators 39 and 40 have their sampling clock frequencies restored to the original frequencies. The I and Q components with their original sampling frequencies are applied to non-linear enhancers 41 and 42, respectively. The non-linear enhancers 41 and 42 compensate waveform deteriorations of the I and Q components, which were caused by the band restrictions at the BPFs 31 and 44. The I and Q components with compensated waveforms are applied to a modulator 43.

The modulator 43 modulates the I and Q components into carrier chrominance components by carriers synchronized with the color subcarrier in two orthogonally related axes. These carrier chrominance components are combined into a single output and then applied to a BPF 44. The BPF 44 restricts the band of the carrier chrominance component so that a stationary C component is obtained from the BPF 44. The stationary C component signal is applied to the mixer 10 and the subtractor 8. The subtractor 8 carries out a subtraction between the stationary C component from the BPF 44 and the output signal from the line memory 4. Thus a stationary Y component is obtained from the subtractor 8. The stationary Y component is applied to the mixer 11 together with the moving Y component from the subtractor 9, as described above.

In the mixer 10, the stationary C component from the BPF 44 and the moving C component from the BPF 6 are mixed together in response to a mixing ratio corresponding to a motion detecting signal from the motion detector 7. The motion detector 7 detects the difference between two adjacent frames. Thus the difference represents the motion of a picture in the digital composite video signal from the A/D converter 2. The difference representing the motion is applied to the mixer 10 as the motion detecting signal. The mixer 11 also mixes the stationary and moving Y components from the subtractors 8 and 9 together in response to the mixing ratio. Thus, the mixers 10 and 11 output motion adaptive C and Y components, respectively.

These motion adaptive C and Y components are applied to digital/analog converters (hereinafter referred to as D/A converters) 12 and 13, respectively. These D/A converters 12 and 13 convert the motion adaptive C and Y components from the digital form to the original analog form. Thus, at the output terminal 14 of the D/A converter 12, the separated motion adaptive C component in the analog form is obtained. Also, at the output terminal 15 of the D/A converter 13, the separated motion adaptive Y component in the analog form is obtained.

Referring now to FIGS. 3A to 3H, operation of the non-linear enhancers 41 and 42 will be described in detail. FIGS. 3A to 3H show signal waveforms at various parts of the Y/C separator, as shown in FIG. 2.

FIG. 3A shows the waveform of the C component output from the line memory 4. FIG. 3B shows the waveform of the output signal from the BPF 31. The envelope of the waveform shown in FIG. 3B is rounded off as a result of the band restriction caused in the BPF 31. FIGS. 3C and 3D show the waveforms of the input signals to the non-linear enhancers 41 and 42, i.e., the I and Q components with their original sampling frequencies by the interpolations in the interpolators 39 and 40. These signals have been obtained by the demodulation from the signal shown in FIG. 3B in the demodulator 32 at the orthogonally related I and Q axes. FIGS. 3E and 3F show the waveforms of the output signals from the non-linear enhancers 41 and 42. These waveforms are compensated for the roundings of the envelopes in the signals as shown in FIGS. 3C and 3D, according to compensations carried out in the non-linear enhancers 41 and 42, as described in detail later. FIG. 3G shows the waveform of the carrier chrominance component output from the modulator 43. FIG. 3H shows the waveform of the output of the BPF 44.

The characteristics of the non-linear enhancers 41 and 42 are so selected that envelopes of the waveforms shown in FIGS. 3A and 3H agree with each other to the best. Thus, the stationary C component is accurately subtracted from the digital composite video signal from the line memory 4 in the subtractor 8, minimizing the residual color components in the stationary Y component.

Figure 4:
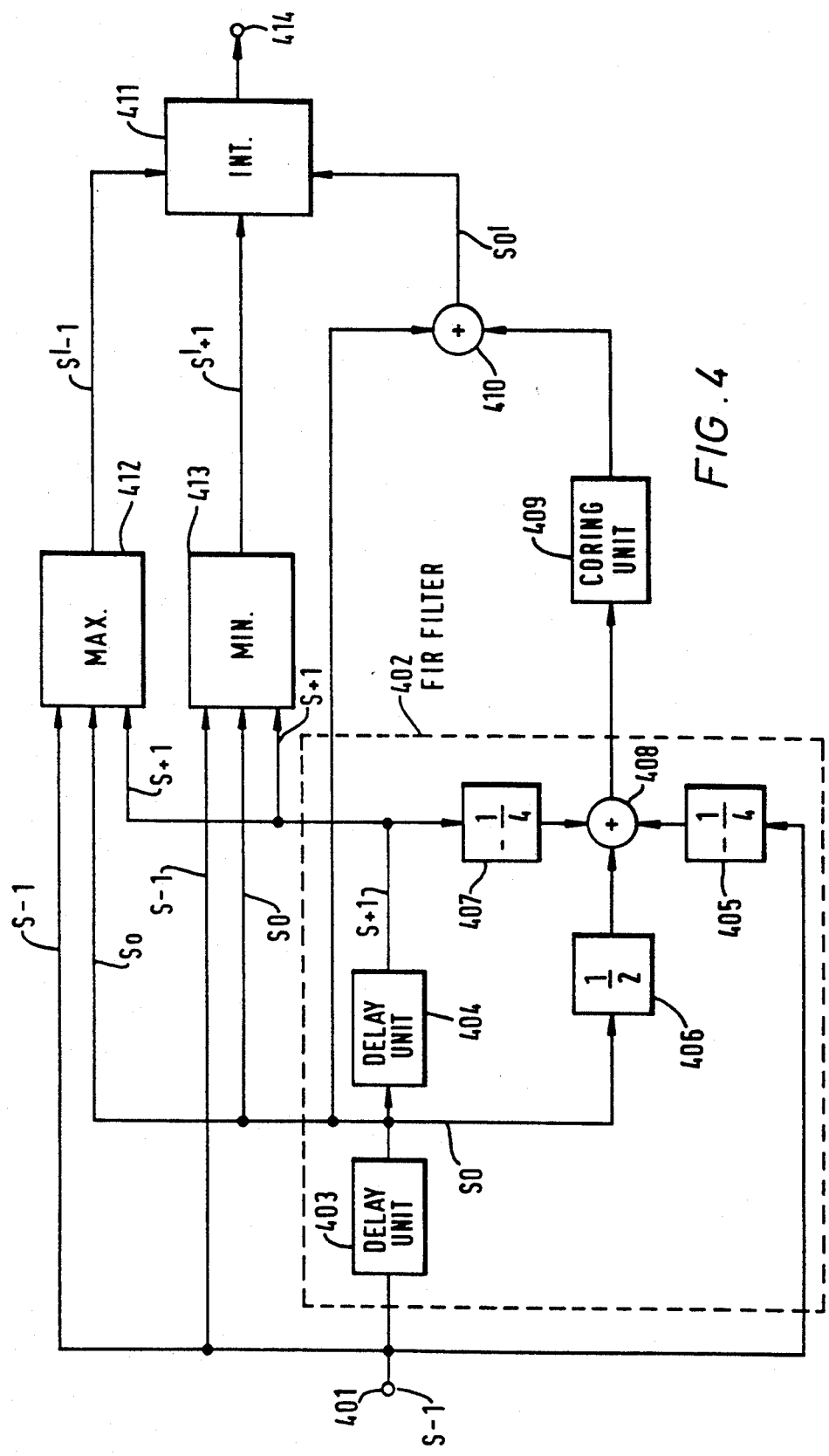
FIG. 4 is a block diagram showing the details of the non-linear enhancer in FIG. 2.
Figure 5:
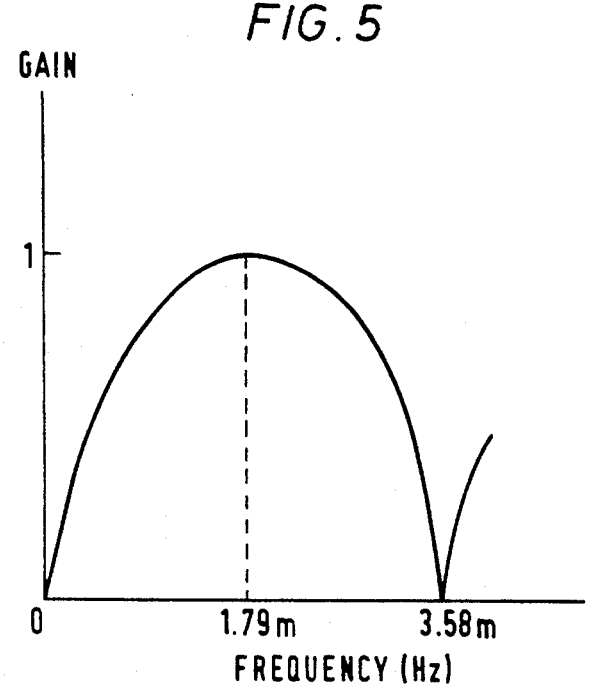
FIG. 5 is a frequency response characteristic of the FIR filter 402 of FIG. 4.
Figure 6:
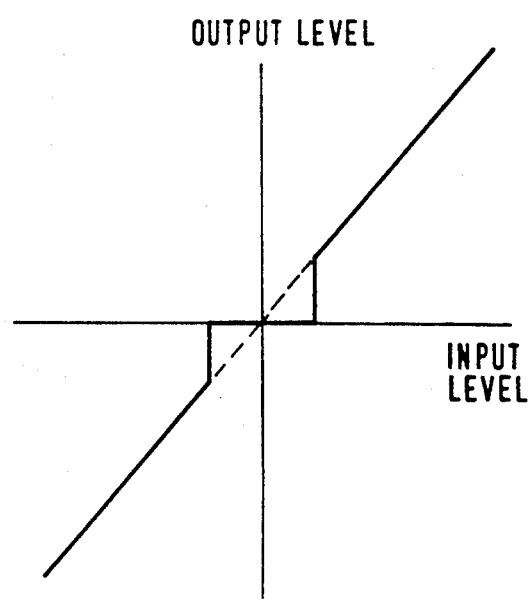
FIG. 6 is an input-output characteristic of the coring unit 409 of FIG. 4.

Referring now to FIGS. 4 through 7, an illustrative embodiment of the non-linear enhancers 41 and 42 will be described in detail below. FIG. 4 shows the construction of the non-linear enhancers 41 and 42. FIGS. 5, 6 and 7 show graphs for explaining the operation of the non-linear enhancer of FIG. 4.

In FIG. 4, a signal S−1 to be compensated is applied to an input terminal 401. The signal S−1 is then applied to an FIR (Finite Impulse Response) filter 402, which is comprised of two delay units 403 and 404, three coefficient units 405, 406 and 407 and an adder 408.

In the FIR filter 402, the signal S−1 is applied to the first delay unit 403 wherein the signal S−1 is delayed for a prescribed period. A delayed signal S0 from the first delay unit 403 is further applied to the second delay unit 404 wherein the signal S0 is again delayed for the prescribed period. Thus, a delayed signal S+1 is obtained from the second delay unit 404.

Further, the signal S−1 on the input terminal 401 is applied to the first coefficient unit 405 wherein the signal S−1 is multiplied by "−¼". The delayed signal S0 from the first delay unit 403 is applied to the second coefficient unit 406 wherein the signal S0 is multiplied by "½". The delayed signal S+1 from the second delay unit 404 is applied to the third coefficient unit 407 wherein the signal S+1 is multiplied by "−¼". These three multiplied signals from the first, second and third coefficient units 405, 406 and 407 are added with each other in the adder 408. The output of the adder 408, i.e., the output from the FIR filter 402, is then applied to a coring unit 409. The coring unit 409 has the input-output characteristic as shown in FIG. 6. That is, the gain of the coring unit 409 is suppressed to "0" within a predetermined region of input values near "zero". Thus the coring unit 409 is able to avoid troubles caused by instability of the input signal, such as noise.

Here it is assumed that the delay time of the delay units 403 and 404 is 280 nsec, so that the FIR filter 402 has a frequency response characteristic as shown in FIG. 5. The frequency response has the peak gain "1" at the frequency of 1.79 MHz, as shown in FIG. 5. The output of the FIR filter 402 thus having the frequency response characteristic is applied to an adder 410 via the coring unit 409 and then added with the signal S0 from the first delay unit 403 of the FIR unit 402 in the adder 410.

As a result of the addition in the adder 410, the input of the non-linear enhancers 41 and 42, i.e., the signal S−1 is enhanced so that the gain "1" is obtained at a DC region (the frequency of 0) and at the frequency of 3.58 MHz, while a gain "2" is obtained at the frequency of 1.79 MHz. This enhanced signal S0' from the adder 410 is applied to an intermediate value unit (hereinafter referred to as INT) 411.

The signals S−1, S0 and S+1 from the input terminal 401, the first delay unit 403 and the second delay unit 404 are applied to a maximum value unit (hereinafter referred to as MAX) 412 and a minimum value unit (hereinafter referred to as MIN) 413. The MAX 412 takes up the maximum value S'+1 among the values of the signals S−1, S0 and S+1. While the MIN 413 takes up the minimum value S'−1 among values of the signals S−1, S0 and S+1. The maximum value and the minimum value are applied to the INT 411 together with the enhanced signal S0' from the adder 410. The INT 411 takes up the intermediate value among the values S'−1, S'+1 and S0'. The intermediate value taken up from the INT 411 is output through an output terminal 414.

Referring now to FIGS. 7A, 7B and 7C, the operations of the units 412, 413 and 411 will be described. As shown in FIGS. 7A and 7B, in the step response, the waveforms of the signals S−1 and S'−1 are equal to each other. The waveforms of the signals S+1 and S'+1 are also equal to each other. On the other hand, the signal S0' is enhanced at the center frequency of 1.79 MHz compared to the signal S0. Therefore, the output from the INT 411 will become the signal with the compensated waveform as shown in FIG. 7C from the signal S0 with the rounded waveform as shown in FIG. 7A.

Figure 8:
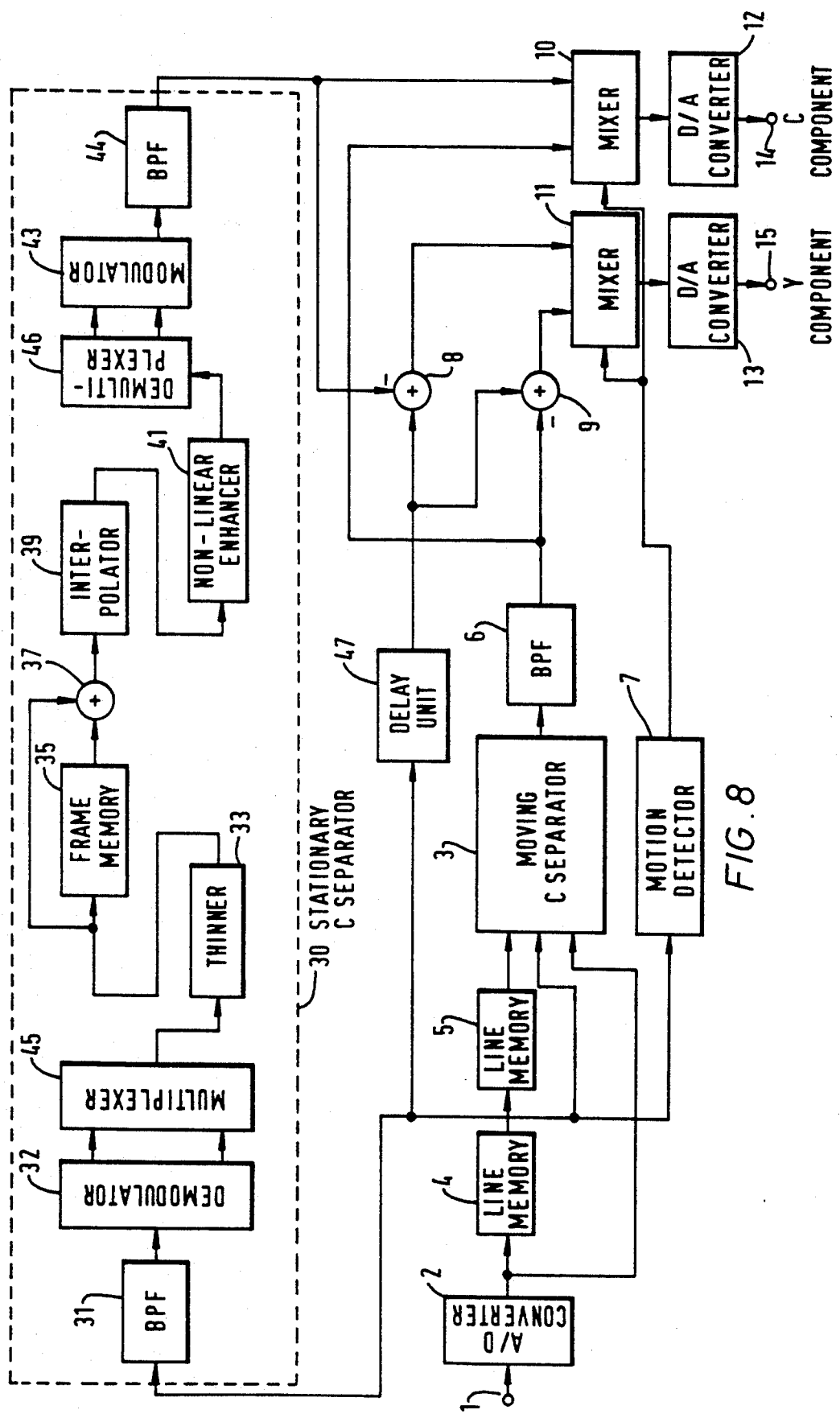
FIG. 8 is a block diagram showing another embodiment of the luminance/chrominance separating apparatus according to the present invention.

Referring now to FIG. 8, another embodiment of the present invention will be described below in brief. In FIG. 8, parts common to those in FIG. 2 are assigned with the same letters or symbols. A remarkable difference between FIG. 8 and FIG. 2 is that two color difference signals from the demodulation circuit 32 are consolidated into one system by multiplexing the signals in the time sequential form by using a multiplexer 45. The output from the multiplexer 45 is applied to the thinner 33. Further, the output from the non-linear enhancer 41 is applied to a demultiplexer 46 wherein the two color difference signals are separated. These separated two color difference signals are applied to the modulator 43. That is, the multiplexer 45 and the demultiplexer 46 are provided for unifying the processings of the I and Q components. According to the construction as shown in FIG. 8, the clock rate for processing the multiplexed signal is two times higher than that of the embodiment of FIG. 2. However, the embodiment of FIG. 8 is able to advantageously reduce the total bit size of the frame memory.

In the embodiments of FIGS. 2 and 8, the demodulator 32 demodulates the I and Q components by using the carrier signals which are synchronized with the color subcarrier signal with the I and Q axes. However, the demodulator 32 can be modified to demodulate color difference signals, "R-Y" component and "B-Y" component. To this end, the demodulator 32 demodulates the "R-Y" and "B-Y" components by carrier signals which are also synchronized with other color subcarrier signals with orthogonally related axes, i.e., "R-Y" and "B-Y" axes. The "R-Y" and "B-Y" axes have phases of 90° and 0°, respectively, when the burst signal has the phase of −180°.

In the Y/C separator as described above, only the stationary C component and the moving C component are separated, while the stationary Y component and the moving Y component are obtained by subtractions between the composite video signal and the stationary C component and the moving C component, respectively. Therefore, the Y/C separator is remarkably reduced in size and also in cost. Particularly, it is very effective in cost that the amount of frame memories and line memories is greatly reduced.

The effect in cost will be analyzed for frame memories which occupy a larger percent of cost in such Y/C separators. Here it is assumed that the sampling frequency for the Y component is 4.Fsc (approximately 14.3 MHz), the sampling frequency for baseband color signal is Fsc (approximately 3.58 MHz), the quantization bits are 8 bits, the number of sampling units for Y component and the number of sampling units for C component in the horizontal scanning period are 910 and 227.5, respectively and the number of lines is 525.

In the conventional Y/C separator the number of bits required for the frame memories is given as follows:

Y processor; 8×910×525=3.822 (M bits)

C processor; 8×227.5×525=1.911 (M bits)

Thus the conventional Y/C separator requires 5.733 M bits in total for the frame memories. If this requirement is covered by a 1 M bit memory chip, at least six chips are required.

On the other hand, in case of the present invention, only the C processor needs the frame memories as follows:

8×227.5×525=1.911 (M bits)

This requirement is satisfied with only two M bit memory chips.

Further, as can be seen from the embodiments of FIGS. 2 and 8, the present invention provides the modulated chrominance components in simple construction so that the Y/C separator can be coupled directly to a home VTR.

As described above, the present invention can provide an extremely preferable Y/C separator.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. A luminance/chrominance separating apparatus for separating a luminance component and a chrominance component from a composite color video signal, comprising:

first separation means for separating a stationary chrominance component, which includes means for demodulating a color difference signal from the composite video signal having a color subcarrier signal, means for outputting an inter-frame sum signal between two adjacent frames of the color difference signal, and means for modulating the inter-frame sum signal with the color subcarrier signal to reproduce the stationary chrominance component;

second separation means for separating a moving chrominance component by detecting a line difference signal between adjacent lines of the composite video signal;

motion detecting means for detecting a motion signal as a frame change between adjacent frames of the composite video signal;

first subtraction means for subtracting the stationary chrominance component from the composite video signal to separate a stationary luminance component;

second subtraction means for subtracting the moving chrominance component from the composite video signal to separate a moving luminance component;

first mixing means responsive to the motion signal for mixing the stationary chrominance component and the moving chrominance component with each other to output the chrominance component; and second mixing means responsive to the motion signal for mixing the stationary luminance component and the moving luminance component with each other to output the luminance component, wherein the demodulating means includes a demodulator for demodulating a pair of color difference signals with orthogonally different phases, the motion detecting means includes a pair of detectors for detecting a pair of inter-frame sum signals from the pair of color difference signals, and the modulating means includes a multiplexer for multiplexing the pair of inter-frame sum signals to reproduce the stationary chrominance component.

2. The luminance/chrominance separating apparatus as claimed in claim 1, wherein the first separation means further includes a pair of means for thinning the pair of color difference signals, a pair of means for interpolating the pair of inter-frame sum signals and a pair of means for compensating rounded envelopes of the pair of interpolated inter-frame sum signals.

3. The luminance/chrominance separating apparatus as claimed in claim 1, wherein the demodulator of the demodulating means and the multiplexer of the modulating means respond to the color subcarrier signal, the color subcarrier signal having I and Q axis components.

4. The luminance/chrominance separating apparatus as claimed in claim 1, wherein the demodulator of the demodulating means and the multiplexer of the modulating means respond to the color subcarrier signal, the color subcarrier signal having R-Y and B-Y axis components.

5. The luminance/chrominance separating apparatus as claimed in claim 3, wherein the pair of detectors include a pair of frame memories which store the color difference signals with sampling frequencies the same as the frequency of the color subcarrier signal and one-third of the frequency of the color subcarrier signal, respectively.

6. The luminance/chrominance separating apparatus as claimed in claim 4, wherein the pair of detectors includes a pair of frame memories which store the color difference signals with sampling frequencies the same as the frequency of the color subcarrier signal and one-third of the frequency of the color subcarrier signal, respectively.

7. A luminance/chrominance separating apparatus for separating a luminance component and a chrominance component from a composite color video signal, comprising:

first separation means for separating a stationary chrominance component, which includes mean for demodulating a color difference signal from the composite video signal having a color subcarrier signal, means for outputting an inter-frame sum signal between two adjacent frames of the color difference signal, and means for modulating the inter-frame sum signal with the color subcarrier signal to reproduce the stationary chrominance component;

second separation means for separating a moving chrominance component by detecting a line difference signal between adjacent lines of the composite video signal;

motion detecting means for detecting a motion signal as a frame change between adjacent frames of the composite video signal;

first subtraction means for subtracting the stationary chrominance component from the composite video signal to separate a stationary luminance component;

second subtraction means for subtracting the moving chrominance component from the composite video signal to separate a moving luminance component;

first mixing means responsive to the motion signal for mixing the stationary chrominance component and the moving chrominance component with each other to output the chrominance component; and second mixing means responsive to the motion signal for mixing the stationary luminance component and the moving luminance component with each other to output the luminance component, further comprising means for delaying the composite video signal supplied to the first and second subtracting means.

8. A luminance/chrominance separating apparatus for separating a luminance component and a chrominance component from a composite color video signal, comprising:

first separation means for separating a stationary chrominance component, which includes means for demodulating a color difference signal from the composite video signal with a color subcarrier signal, means for outputting an inter-frame sum signal between two adjacent frame so the color difference signal, and means for modulating the inter-frame sum signal with the color subcarrier signal to reproduce the stationary chrominance component;

second separation means for separating a moving chrominance component by detecting a line difference signal between adjacent lines of the composite video signal;

motion detecting means for detecting a motion signal as a frame change between adjacent frames o the composite video signal;

first subtraction means for subtracting the stationary chrominance component from the composite video signal to separate a stationary luminance component;

second subtraction means for subtracting the moving chrominance component from the composite video signal to separate a moving luminance component;

first mixing means responsive to the motion signal for mixing the stationary chrominance component and the moving chrominance component with each other to output the chrominance component; and second mixing means responsive to the motion signal for mixing the stationary luminance component and the moving luminance component with each other to output the luminance component, wherein the demodulating means includes a demodulator for demodulating a pair of color difference signals with orthogonally different phases, the first separation means further includes a first multiplexer for multiplexing the pair of the color difference signals and a demultiplexer for demultiplexing the inter-frame sum signal into a pair of signals with orthogonally different phases, and the modulating means includes a second multiplexer for multiplexing the pair of inter-frame sum signals t reproduce the stationary chrominance component.

9. The luminance/chrominance separating apparatus as claimed in claim 8, wherein the demodulator of the demodualting means and the second multiplexer of the modulating means respond to the color subcarrier signal, the color subcarrier signal having I and Q axis components.

10. The luminance/chrominance separating apparatus as claimed in claim 8, wherein the first separation means further includes means for thinning the multiplexed color difference signal, means for interpolating the frame difference signal and means for compensating a rounded envelope of the interpolated frame difference signal.

11. The luminance/chrominance separating apparatus as claimed in claim 8, wherein the demodulator of the demodulating means and the second multiplexer of the modulating means respond to the color subcarrier signal, the color subcarrier signal having R-Y and B-Y axis components.

12. A luminance/chrominance separating apparatus for separating a luminance component and a chrominance component from a composite color video signal, comprising:

first separation means for separating a stationary chrominance component, which includes means for demodulating a color difference signal from the composite video signal having a color subcarrier signal, means for outputting an inter-frame sum signal between two adjacent frames of the color difference signal, and means for modulating the inter-frame sum signal with the color subcarrier signal to reproduce the stationary chrominance component;

second separation means for separating a moving chrominance component by detecting a line difference signal between adjacent lines of the composite video signal;

motion detecting means for detecting a motion signal as a frame change between adjacent frames of the composite video signal;

first subtraction means for subtracting the stationary chrominance component from the composite video signal to separate a stationary luminance component;

second subtraction means for subtracting the moving chrominance component from the composite video signal to separate a moving luminance component;

first mixing means responsive to the motion signal for mixing the stationary chrominance component and the moving chrominance component with each other to output the chrominance component; and second mixing means responsive to the motion signal for mixing the stationary luminance component and the moving luminance component with each other to output the luminance component, wherein the first separation means further includes means for thinning the color difference signal, means for interpolating the inter-frame sum signal and means for compensating a rounded envelope of the interpolated inter-frame sum signal.

* * * * *

UNITED STATES PATENT AND TRADEMARK OFFICE
CERTIFICATE OF CORRECTION

PATENT NO. : 5,231,476
DATED : July 27, 1993
INVENTOR(S) : Masahiko Mawatari et al.

It is certified that error appears in the above-indentified patent and that said Letters Patent is hereby corrected as shown below:

Claim 6, column 10, line 50, change "includes" to --include--.

Claim 7, column 10, line 60, change "mean" to --means--.

Claim 8, column 11, line 35, change "frame so" to --frames of--.

Claim 8, column 11, line 45, change "o" to --of--.

Claim 8, column 12, line 4, change "t" to --to--.

Signed and Sealed this

Twenty-first Day of June, 1994

BRUCE LEHMAN

*Attest:*

*Attesting Officer*    Commissioner of Patents and Trademarks